Aug. 22, 1961     D. W. BARTON     2,997,123
POWER STEERING MECHANISM

Filed May 26, 1959     2 Sheets-Sheet 1

D. W. BARTON
INVENTOR.

BY J. R. Faulkner
T. Van Meter

ATTORNEYS

Aug. 22, 1961  D. W. BARTON  2,997,123
POWER STEERING MECHANISM
Filed May 26, 1959  2 Sheets-Sheet 2
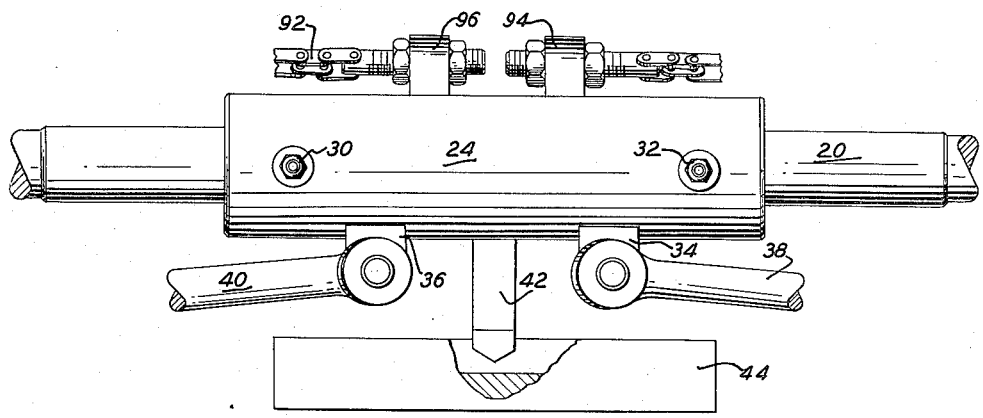
FIG. 2
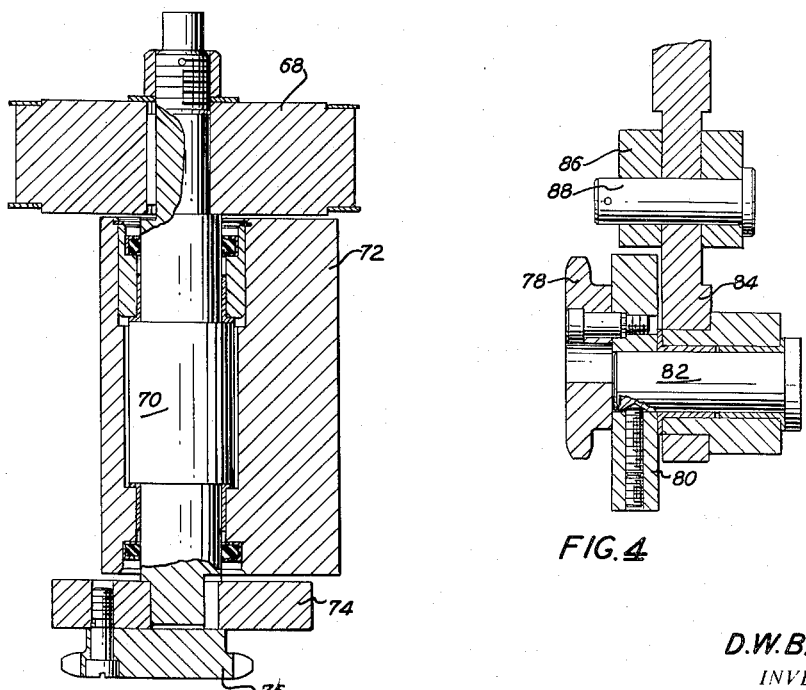
FIG. 3
FIG. 4
D. W. BARTON
INVENTOR.
BY J. R. Faulkner
T. Van Meter
ATTORNEYS United States Patent Office 2,997,123
Patented Aug. 22, 1961

2,997,123
POWER STEERING MECHANISM
David W. Barton, Birmingham, Mich., assignor to Ford Motor Company, Dearborn, Mich., a corporation of Delaware
Filed May 26, 1959, Ser. No. 815,922
3 Claims. (Cl. 180—79.2)

This invention relates generally to power steering mechanisms for motor vehicles, and more particularly to a variable ratio power steering mechanism.

Power steering devices for motor vehicles have met with wide acceptance in recent years. Originally the power mechanism was merely applied to an otherwise conventional steering system. Although steering effort was reduced, the steering gear reduction remained the same, that is, both manual and power steering systems utilized the same ratio of steering wheel turns to road wheel turns. Thus, optimum use was not made of the power feature since high steering ratios had evolved due to the high front wheel loadings in modern vehicles. The next step was to provide lower steering ratios in vehicles equipped with power steering. However, it was found that when the steering ratio was reduced to a desirable range for steering operations such as parking and low speed maneuvering, there was a tendency for the driver to over-control at high speed.

The prior art has suggested the use of a variable ratio gear to provide, in effect, a high steering ratio in the region of straight-ahead steering and a lower ratio as the wheels depart from the straight-ahead position. Thus, when the vehicle is being operated at highway speeds, steering will take place through a high ratio connection, and during operations such as parking and low speed maneuvering, full deflection of the steered wheels can be obtained with a desired mimium of turns of the steering wheel.

Most previous variable ratio power steering gears have been highly critical from a manufacturing standpoint in that they have involved intricate gear forms and the like. This has of course unfavorably affected the cost of the gears and has presented a serious service problem for the average garage mechanic.

It is an objective of this invention to provide an improved variable ratio power steering gear.

A further object is to provide such a variable ratio steering gear, which is low in cost, by reason of employing simple construction, and in some instances, standard, off-the-shelf parts.

Another object is to provide such a power steering gear which is reliable, rugged, and easy to maintain.

Further objects and advantages of the present invention will be apparent from the following description, reference being had to the accompanying drawings wherein a preferred form of the present invention is clearly shown.

In the drawings:

FIGURE 2 is a top elevational view of a portion of the mechanism shown in FIGURE 1;

FIGURE 3 is a sectional view taken on line 3—3 of FIGURE 1;

FIGURE 4 is a sectional view taken on line 4—4 of FIGURE 1.

Figure 1:
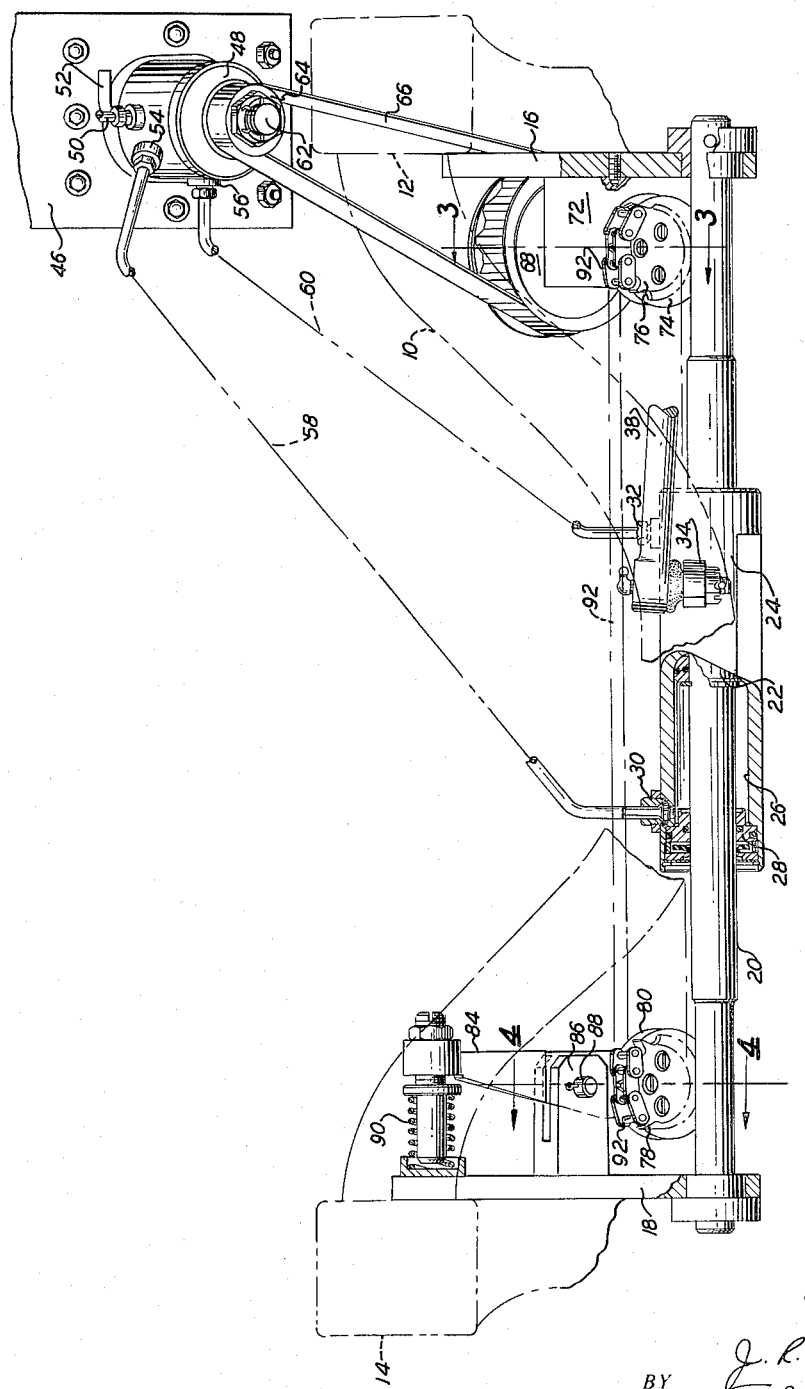
FIGURE 1 is a front elevational view of power steering mechanism incorporating the present invention.

Referring now to FIGURE 1, there is shown in phantom a front cross frame member 10 of a vehicle having a power steering system incorporating the present invention. The cross frame member 10 is carried by a pair of side frame members 12 and 14. A mounting bracket 16 is secured to the side frame member 12 and a mounting bracket 18 is secured to the side frame member 14. A piston rod 20 extends transversely across the vehicle and is mounted at opposite ends in the brackets 16 and 18. Piston rod 20 is fixed relative to the vehicle frame and carries at its center a piston 22 on which is mounted a cylinder 24 having a bore 26 in slidable fluid sealing engagement with the piston 22. Cylinder 24 has the usual rod seals 28, only one of which is shown, at its opposite ends. The cylinder 24 is also provided with a pair of fluid connection ports 30 and 32. It will be apparent that if pressure fluid is supplied to the connection port 30, the cylinder 24 will translate leftwardly, in the direction of the axis of piston rod 20. Similarly, if pressure fluid is supplied to connection port 32, cylinder 24 will shift to the right transversely across the vehicle along the line of the axis of the piston rod 20.

The cylinder 24 carries a pair of ears 34 and 36, to which are pivotally attached a pair of tie rods 38 and 40. Tie rods 38 and 40 extend to connect at their outer ends in the conventional fashion with the steering arms of a pair of dirigible wheels not shown. Thus, translatory movement of cylinder 24 along its axis will effect steering movement of the vehicle wheels in a manner well known in the art.

The eccentric mounting of tie rods 38 and 40 on cylinder 24 results in a torque tending to turn cylinder 24 about its central axis. This torque is counteracted by an arm 42 extending radially out from the cylinder 12 to engage a transverse, slotted member 44 which is attached to the vehicle frame.

A mounting plate 46 is secured to the toe board of the vehicle and carries a servo valve 48. The steering column, not shown, of the motor vehicle extends through the toe board and into the servo valve 48. Valve 48 may be of the conventional, open-center 4-way type having a pressure connection 50, a tank connection 52, and a pair of motor connections 54 and 56. Motor connections 54 and 56 are connected through flexible conduits 58 and 60 to the connecting ports 30 and 32 respectively of cylinder 24.

The vehicle steering column connects through the usual resiliently opposed lost motion connection with shaft 62, which extends from the forward end of servo valve 48. The lost motion between the steering column and the shaft 62 actuates the valving elements in the servo valve 48 in a manner which is well known in the art, and need not be described in any greater detail.

Shaft 62 has fixedly mounted thereon a toothed pulley 64 which transmits manual steering effort through a flexible belt 66 to a larger toothed pulley 68. The toothed pulley 68 is keyed to a shaft 70 which is carried in a bearing block 72, as best seen in FIGURE 3. The bearing block 72 is secured to the mounting bracket 16 which is in turn fixed to the vehicle side frame member 12, as previously noted. The shaft 70 extends through the bearing block 72 and carries at its lower end a mounting plate 74 which is keyed to the shaft 70. Mounting plate 74 may be a circular disc as illustrated, which is mounted concentric with the axis of rotation of shaft 70. Mounting plate 74 has secured thereto a sprocket 76 which has its central axis offset from the axis of driveshaft 70. The eccentricity of the sprocket 76 is such that the distance from the axis of shaft 70 to the pitch line of sprocket 76 is a minimum, when measured in the downward direction, when the steering wheel of the vehicle and the steered wheels are in their straight-ahead position.

On the opposite side of the vehicle from sprocket 76, a similar sprocket 78 is eccentrically secured to a mounting plate 80 which is carried by an idler shaft 82 which is rotatably journalled in an idler arm 84. Idler arm 84 is pivotally mounted in a clevis 86 by a pin 88, and is biased by a spring 90 so as to continuously tend to move the sprocket 78 outwardly of the vehicle. When the steering components of the vehicle are in the straight-ahead position and cylinder 24 is centered, as illustrated, the distance from the axis of the shaft 82 to the pitch line of sprocket 78 is a minimum when measured in the downward direction.

A flexible link belt 92 has an upper run extending transversely across the vehicle engaging the sprockets 76 and 78, and a pair of end lengths which extend from the bottom of sprockets 76 and 78 to turnbuckle connections with a pair of ears 94 and 96, which extend radially outward from the cylinder 24. The turnbuckle connection to the ears 94 and 96 can be utilized to adjust the link belt tension and the centered position of the cylinder 24, and the spring biased idler arm 84 will maintain the link belt taut.

In the operation, it will be seen that when the mechanism is in the straight-ahead position illustrated, a manual steering movement applied to the steering column will be transmitted to the cylinder 24 and the dirigible wheels of the vehicle through a relatively short lever arm, resulting from the eccentric mounting of the sprockets 76 and 78. Thus, when the vehicle is in the straight-ahead position a relatively large steering input movement will result in a relativelly small steering output movement. However, as the steered wheels depart from the straight-ahead position, steering force will be applied through an increasingly longer lever arm until, when the sprockets 76 and 78 have rotated 180 degrees, the overall steering ratio will be a minimum.

It will be seen from the foregoing that the present invention has provided a variable ratio power steering mechanism which is low in cost, rugged, simple, and easy to maintain.

While the form of embodiment of the invention as herein disclosed constitutes a preferred form, it is to be understood that other forms might be adopted, all coming within the scope of the claims which follow.

What is claimed is as follows:

1. In a power steering system for a motor vehicle having a frame and steering linkage connectable to dirigible wheels mounted thereon, the combination of: a fluid motor having a pair of relatively movable members, one connected to the frame, the other to said linkage; a servo valve for controlling said fluid motor; mechanical input means mounted on said frame, including a part rotatable about an axis and an eccentric carried by said part located at one side of said fluid motor; an idler member, including a shaft rotatable about an axis and an eccentric carried by said shaft located on the side of said fluid motor opposite said one side, and a flexible drive element connecting said other member of the fluid motor with both said eccentrics at points of minimum eccentricity when said dirigible wheels are in the straight-ahead position.

2. The structure defined in claim 1 which is further characterized in that said eccentrics comprise sprockets and said flexible element comprises a link belt.

3. The structure defined in claim 1 which is further characterized in that said fluid motor members are relatively movable along a line transverse of the vehicle, and said axes are disposed substantially perpendicular to that line.

References Cited in the file of this patent

UNITED STATES PATENTS

| | | |
|---|---|---|
| 2,485,792 | Van Voorhis | Oct. 25, 1949 |
| 2,754,924 | Hammond | July 17, 1956 |
| 2,865,339 | Bishop | Dec. 23, 1958 |